(No Model.)
D. T. WINTER.
MACHINE FOR MEASURING THE AREA OF HIDES, &c.
No. 258,970. Patented June 6, 1882.
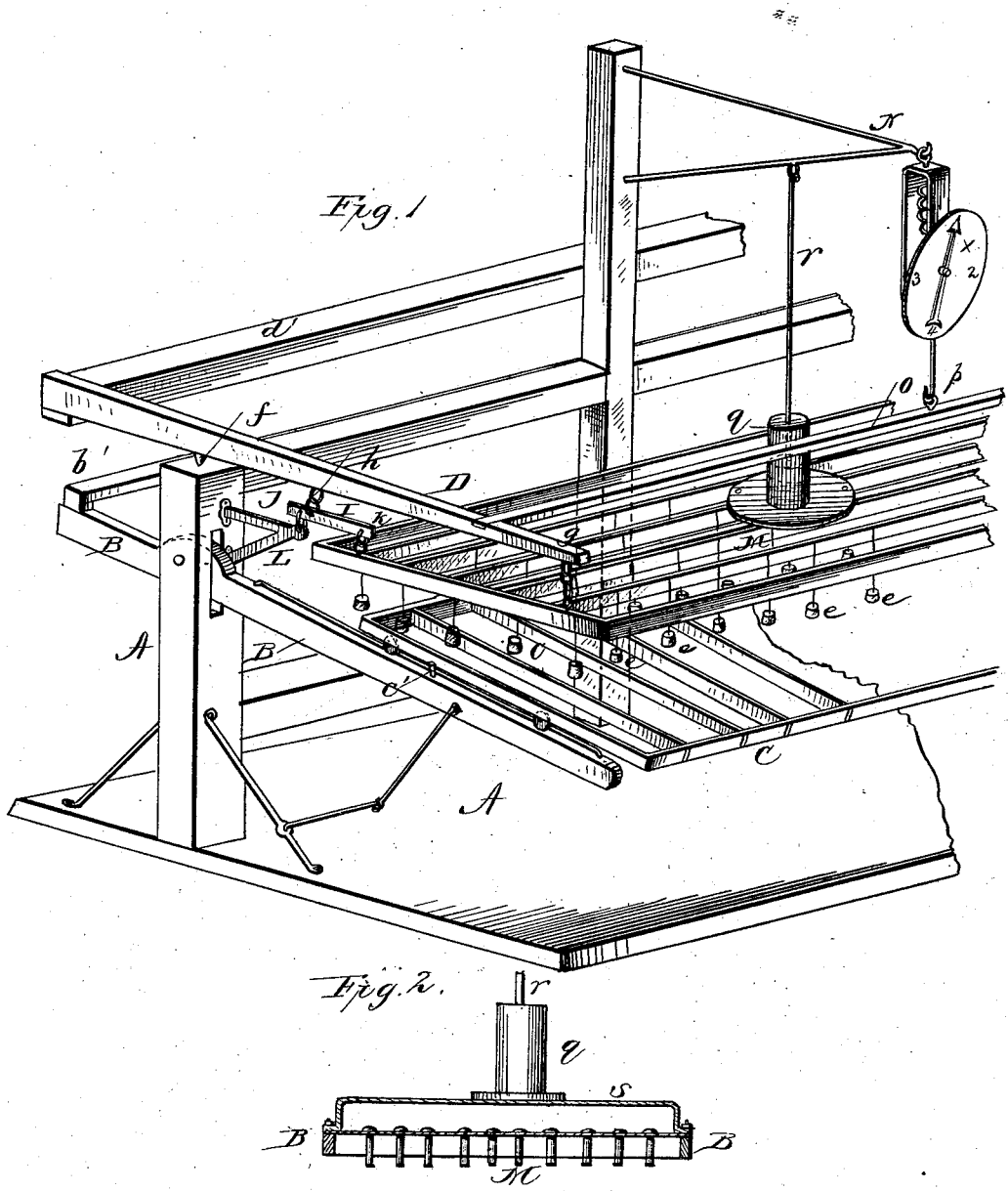

UNITED STATES PATENT OFFICE.

DAVID T. WINTER, OF PEABODY, MASSACHUSETTS.

MACHINE FOR MEASURING THE AREA OF HIDES, &c.

SPECIFICATION forming part of Letters Patent No. 258,970, dated June 6, 1882.

Application filed June 10, 1881. (No model.)

*To all whom it may concern:*

Be it known that I, DAVID THOMAS WINTER, a subject of the Queen of England, residing at Peabody, in the county of Essex and State of Massachusetts, have invented certain new and useful Improvements in Machines for Measuring the Areas of Skins and other Irregular Surfaces; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My improvement relates to a novel system of equalizing-levers in machines for measuring skins or other irregular surfaces, the levers sustaining the system of weights by which the measurements are determined.

The nature of the invention will be apparent from the following description, and while it is applicable to other varieties of area or surface measuring machines, I will describe it as applied to one in which the skin to be measured is supported upon a sliding table or carriage adapted to run on a lever-frame—such, for instance, as is shown in my application filed March 17, 1881.

Figure 1 is a perspective view of sufficient parts of a machine to show my improvement applied thereto; Fig. 2, a detail, showing the position of the water-cylinder when pins are used for the weights.

A is the frame-work; B, the lever-frame, having an iron weight or counterpoise, $b'$; and C, the sliding table or carriage, having an appropriate stop, $c'$, to limit its running-out movement when the frame B is lowered to place a skin on the table. These parts are substantially like those in my above-named application.

D, with its iron weight or counterpoise $d'$, is the balanced frame which sustains the system of pendent measuring pins or weights $e$; but instead of these pins or weights being hung directly therefrom, as heretofore, so that the frame and its weights shall have in common but one pivotal or fulcrum point, as at $f$, I hang my system of weights from two sets of lever-frames or levers, substantially as follows: Suppose the distance from $f$ to the extremity $g$ of the frame D to be represented by 6, and the distance from $f$ to a point, $h$, on said frame be represented by 1, or, in other words, be one-sixth the whole length, $fg$. Now, at this point $h$, I suspend a short lever, I, one at each side of the machine, (or it may be a lever-frame extending across the machine,) the shorter and rear arm, $j$, of which is about one-fifth the length of its longer and forward arm, $k$, and I connect this arm $j$ by any appropriate link or pivotal connection to a brace or bracket, L. To these arms $j$, I hang the inner end of the slatted table or of the frame or plate M, which holds the system of weights, and the outer end of such frame or plate I hang or suspend from the points or extremities $g$ of frame D. I thus get a novel system of equalizing-levers, and with it all the weights composing the system of weights may be of the same size and all the rows from front to rear at equal distances apart, the smaller or rear levers or frame, I, having the same ratio of leverage—say 5 to 1—from the point $h$ as the larger frame, D, has from the same point, the effect of which is to preserve, as nearly as practicable, a horizontal position of the frame M, and consequently of the whole body of weights when the machine is in use, and also that when this body or system of weights rises it will rise perfectly vertically and each and all will bear equally on the scale or indicator.

The spring-balance is suspended from the main bracket N, and is connected by a chain or other connection to a cross-brace, O, of the frame or levers D by an appropriate eye or hook, $p$. This constitutes the connection between the weight or weighted table and the spring-indicator. The farther forward the bracket N and eye $p$ are put the less will the indicator-hand $x$ move for a foot of measurement, and the farther back it is put toward the pivots or bearings $f$ the more will it indicate or measure. Thus it will be seen that this position of the eye can be adjustable or made adjustable to suit the number of graduations on the indicating-scale, or for heavier or lighter systems of weights.

The cross-brace O may be placed forward or backward at any desired position, and the eye $p$ put in it in any desired place.

The under or weighted frame or table, M, may support the can or cylinder $q$ of a water-stop apparatus—such, for instance, as shown in my patent No. 231,741, inasmuch as the movements of this table being in vertical lines there would be little or no friction on the disk or plunger when this weighted table rises and falls. The upper end of the plunger-rod $r$ may in this case be connected with the main bracket N by a loose joint, that it may be free to swing sufficiently in any direction without causing the disk or plunger to bear hard enough against the side of the can to produce any harmful friction. The water-cylinder $q$ is preferably placed as near the center as possible of the weight-table M. The function of the cylinder is that of a regulator to keep the hand on the zero-point when the machine is at rest, and to prevent fluctuations due to changes in the atmosphere by simply adding more water or taking a little away, as the case may be. When pins are used for the weights, as shown in Fig. 2, the cylinder $q$ should rest on a cross-bar, $s$, placed several inches above the heads of the pins, so as not to interfere with their rising and falling, this cross-bar being connected to the arms of the lever-frame B. The pendent weights may hang by their own heads or from cords, or be of any known or desired kind, and the ratio or difference of length between the arms of the levers may be such as may be best adapted for any particular machine.

I claim—

In a skin-measuring machine, in combination with a system of weights of equal weight and arranged in rows equidistant from each other, a system of equalizing-levers, substantially as and for the purpose described.

In testimony whereof I have affixed my signature in presence of two witnesses.

DAVID THOS. WINTER.

Witnesses:
FRED. E. WINTER,
C. A. HAMMOND.